United States Patent [19]
Blair

[11] Patent Number: 5,167,388
[45] Date of Patent: Dec. 1, 1992

[54] CABLE SUPPORT SYSTEM FOR ORGANIZING CABLES AT DOCKSIDE

[75] Inventor: James W. Blair, West Bloomfield, Mich.

[73] Assignee: McGaffer, Inc., Detroit, Mich.

[21] Appl. No.: 736,004

[22] Filed: Jul. 25, 1991

[51] Int. Cl.$^5$ .............................. F16L 3/22
[52] U.S. Cl. ................... 248/68.1; 248/74.1
[58] Field of Search ......... 248/68.1, 65, 74.1, 248/74.4, 70; 24/459, 543; 174/157

[56] References Cited

U.S. PATENT DOCUMENTS

| | | | |
|---|---|---|---|
| 2,425,935 | 8/1947 | Hayman | 248/68.1 X |
| 3,854,684 | 12/1974 | Moore | 174/157 X |
| 4,224,721 | 9/1980 | Ohlson | 248/68.1 X |
| 4,304,077 | 12/1981 | Muller | 248/68.1 X |
| 4,899,964 | 2/1990 | Sick | 24/459 X |

FOREIGN PATENT DOCUMENTS 308750  2/1969  Sweden ................ 248/68.1

Primary Examiner—J. Franklin Foss
Attorney, Agent, or Firm—Dykema Gossett

[57] ABSTRACT

A unique cable mounting system is disclosed for use at dockside. Brackets may be spaced along the length of the cables to keep them in a secure position relative to the dock and a boat. The brackets may be easily and quickly moved from a release position where the cables may be mounted or removed, to a secure position which tightly secures the cables within the brackets.

9 Claims, 1 Drawing Sheet

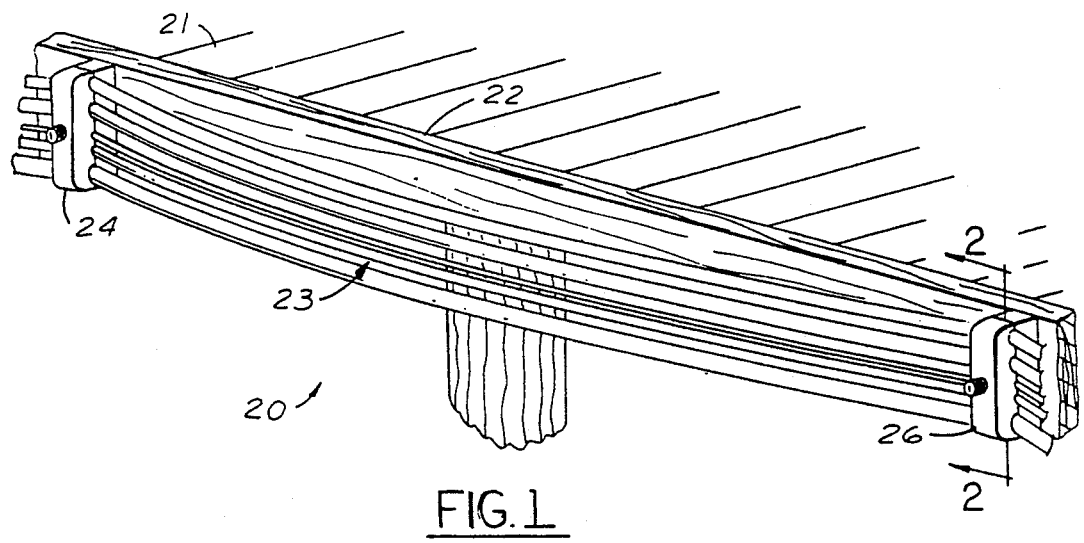
FIG. 1
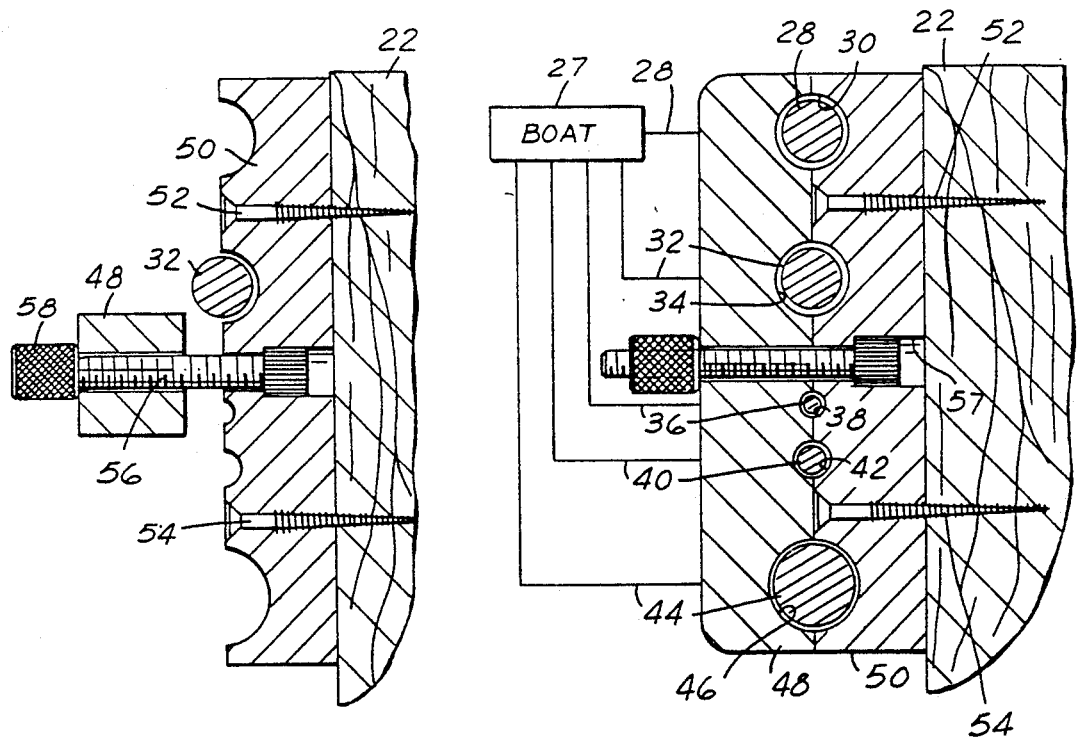
FIG. 3
FIG. 2

CABLE SUPPORT SYSTEM FOR ORGANIZING CABLES AT DOCKSIDE

BACKGROUND OF THE INVENTION

This application relates in general to a system for organizing cables leading from a boat to a location on land.

Boats are often kept at a dock for relatively long periods of time. Cables may be ran from land to the boat to power various electronic equipment, and also to supply fresh water to the boat. Examples of such cables are for electrical power lines, cable television lines, telephone lines, and could also include a hose or conduit to supply fresh water. Other types of line would come within the scope of this invention.

When the cables are left unrestrained they may fall from the dock into the water or interfere with the walkway access. Further, the cables may become entangled, which is also undesirable. The cables may also be strewn about walkways on the dock, such that they could be walked on or could cause accidents by persons tripping over the cables.

SUMMARY OF THE INVENTION

The present invention addresses the above-discussed problems by disclosing a relatively simple cable organizing system which has particular utility at dockside. It may be used quickly and simply. In a method according to the present invention, wires from a boat are placed into any one of a plurality of wire apertures in a bracket fixed to a dock. The bracket is moved to a closed position, and a bolt is tightened to secure the wires within the bracket.

More preferably, the bracket consists of a front part and a rear part, with the rear part affixed to a dock face and the front part releasably secured to the rear part. The front part is preferably released, move away from, and/or turned 90 degrees relative to the rear part such that the apertures are accessible. The cables then may be inserted. The front part is returned and the bolt is tightened to secure the cables within the bracket.

In an apparatus according to present invention, the bracket include front and rear parts, each having mating faces which include grooves defining halves of the wire apertures. The front part is turned and/or moved axially away from rear part to a loosened position. Cables are inserted into the aperture grooves in the rear part when the front part is in the loosened position. The front part is moved back towards the rear part and tightened. In a preferred embodiment, a bolt secures the front part to the rear part. The bolt head is received in a bore in the rear part prior to the rear part being attached to the dockside. The bolt extends through an aperture in the rear part, and the front part is received on the bolt.

These and other features and objects of the present invention may be best understood from the following specification and drawings, of which the following is a brief description.

BRIEF DESCRIPTION OF THE DRAWINGS

FIG. 1 is a perspective view of a dock incorporating the novel bracket.

FIG. 2 is a cross-sectional view along line 2—2 as shown in FIG. 1.

FIG. 3 is a view similar to FIG. 2, but showing the bracket in the loosened position.

DESCRIPTION OF THE PREFERRED EMBODIMENT

FIG. 1 shows cable mount system 20 for organizing cables on the face 22 of a dock 21. A plurality of cables 23 are supported in brackets 24 and 26. It should be understood that if cables 23 extend for a greater length, additional brackets may be utilized. Further, only one bracket need be utilized if the cables extend for a relatively short distance.

FIG. 2 shows a cross-sectional view through bracket 26. Boat 27 may have first cable 28, which may be a power line, extending through aperture 30. A second cable 32, which may also be a power line may extend through aperture 34. A third line 36, which may be a cable television line may extend through aperture 38. A fourth line 40, which may be a telephone line may extend through aperture 42. A fifth line 44, which may be a fresh water hose or conduit may extend through aperture 46. Any type of line can be used, of course, and this list is not limiting.

Bracket 26 is formed of front part 48 and rear part 50. Rear part 50 is shown secured to docket face 22 by securing members or fasteners 52 and 54, which may preferably be screws. Bolt 56 has a head received in bore 57 formed in rear part 50. Apertures 30, 34, 38, 42 and 46 are defined by grooves formed in the mating faces of both front part 48 and rear part 50.

The bolt head is preferably inserted into bore 57 prior to rear part 50 being secured to dock face 22. The threaded portion of bolt 56 extends through an aperture in rear part 50. Nut 58 is tightened on the bolt 56 to lock front part 48 to rear part 50.

As shown in FIG. 3, when one desires to mount the cables within the apertures, nut 58 is released and front part 48 is moved away from rear part 50 and/or turned. There is now a clearance between front and rear parts 48 and 50 and the cables are inserted into the apertures. Once the cables are aligned in their respective apertures, front part 48 is turned and/or moved toward rear part 50. Nut 58 is tightened on bolt 56. The cables are now secured within the apertures in bracket 26. Smaller apertures are preferably placed near bolt 56, since the central apertures are less accessible than the outer apertures.

In one preferred embodiment, the bracket was formed of an aluminum body with a stainless steel bolt. The nut was aluminum and had a knurled surface. Stainless mounting screws were used to secure the rear part to the dock.

The brackets may be mounted on the dock face either vertically, as shown, or horizontally.

The preferred embodiment of the present invention is disclosed, however, a worker of ordinary skill in the art would recognize that certain modifications would come within the scope of this invention. For that reason the following claims should be studied in order to determine the true scope and content of this invention.

I claim:

1. A method of organizing cables from a boat comprising the steps of:
   (1) mounting a bracket on a dock;
   (2) inserting cables from a boat within apertures in the bracket, the bracket being in a loosened position;
   (3) moving the bracket to a closed position;
   (4) locking the cables within the bracket;

(5) the bracket comprising a front and rear part which are removed relative to each other when the brackets are in the loosened position, the two parts being moved together to be aligned with each other in step (3), and a bolt being tightened to lock the bracket as recited in step (4), and the front part being moved axially away from, and turned relative to the rear part to reach the loosened position; and (6) there being a plurality of brackets spaced along the length of the cable, wherein each of the plurality of bracket is moved between loosened and locked positions by the method steps.

2. The method of organizing cables as recited in claim 1, wherein the parts are turned relative to each other to the loosened position.

3. The method of organizing cables as recited in claim 1, wherein the cables lead from the boat to supply points on land.

4. A system for organizing cables from a boat comprising:
- a rear part fixed to a dock, and a front part which is pivotable relative to said rear part;
- a plurality of cables extending from a boat through apertures in said bracket and to supply sources on land;
- a bolt for selectively securing said front part relative to said rear part, said front and rear parts having mating faces with grooves defining said apertures, said bolt being loosened such that said front part may move relative to said rear part and said cables can be inserted in said apertures, a nut being disposed on said bolt to secure said front part to said rear part; and
- said rear part having a bore that receives a head of said bolt, said bolt threads extending through the remainder of said rear part and the entirety of said front part, said nut being received on an opposed end of said bolt from said head at the opposed face of said front part, said bolt being sufficiently long to extend through and beyond said nut so as to allow said nut to be loosened, and remain on said bolt, and said front part to be moved away from said rear part and turned while said nut remains on said bolt.

5. The system for organizing cables as recited in claim 4, wherein power cords are received in said apertures.

6. The system for organizing cables as recited in claim 4, wherein a cable television line is received in one of said apertures.

7. The system for organizing cables as recited in claim 4, wherein a telephone line is received in one of said apertures.

8. The system for organizing cables as recited in claim 4, wherein a water supply hose is received in one of said apertures.

9. The system for organizing cables as recited in claim 4, wherein a plurality of said brackets are spaced along the length of said cables.

* * * * *